United States Patent [19]

Ebstein

[11] Patent Number: 5,091,801
[45] Date of Patent: Feb. 25, 1992

[54] METHOD AND APPARATUS FOR ADJUSTING THE FOCAL LENGTH OF A OPTICAL SYSTEM

[75] Inventor: Steven Ebstein, Brookline, Mass.

[73] Assignee: North East Research Associates, Inc., Woburn, Mass.

[21] Appl. No.: 424,190

[22] Filed: Oct. 19, 1989

[51] Int. Cl.$^5$ ............................ G02B 1/06; G02B 3/14
[52] U.S. Cl. ........................................................ 359/665
[58] Field of Search ........................ 350/418, 419, 442

[56] References Cited

U.S. PATENT DOCUMENTS

| | | | |
|---|---|---|---|
| 4,331,388 | 5/1982 | McCrobie et al. | 350/419 |
| 4,497,544 | 2/1985 | Mitchell et al. | 350/353 |
| 4,582,398 | 4/1986 | Roberts et al. | 350/419 |
| 4,732,458 | 3/1988 | Zambelli | 350/419 |
| 4,758,072 | 7/1988 | Harrigan | 350/419 |
| 4,872,743 | 10/1989 | Baba et al. | 350/353 |

FOREIGN PATENT DOCUMENTS 0000401 1/1985 Japan .................................. 350/418

Primary Examiner—Bruce Y. Arnold
Assistant Examiner—Rebecca D. Gass
Attorney, Agent, or Firm—Kenyon & Kenyon

[57] ABSTRACT

A nearly index matched (NIM) optic is formed from at least two elements having indices of refraction that are substantially the same over a given range of wavelengths. The optical cell can have matched solid and fluid lenses in which the solid has at least one curved interface in contact with the fluid. The solid and fluid share a boundary with equal but opposite curvature at each point over the aperture of the NIM optic. The effective optical curvature of the boundary is reduced by the difference in the index of refraction between the two elements of the NIM optic. This difference in the index of refraction can be controlled by changing the index of refraction of at least one of the elements so as to change the difference in the index of refraction across the optical boundary.

21 Claims, 7 Drawing Sheets

METHOD AND APPARATUS FOR ADJUSTING THE FOCAL LENGTH OF A OPTICAL SYSTEM

BACKGROUND OF THE INVENTION

The present invention relates to a method and apparatus for focusing light.

There are many instances in which it is desirable to modify the focal length of an optical system having any number of lenses, mirrors or combinations thereof. A common example of a variable focal length optical system is a zoom lens; it can change the focal length of a camera or other optical system over a wide latitude by changing the physical position of different lenses relative to each other. Creating smaller changes in focal length, however, is far more difficult due to the high tolerances required for the optical elements. The focal length of an optical element is typically determined by grinding and polishing the optical elements to an appropriate curvature. Optical elements can have slightly different focal lengths if they have slightly different curvatures. It is well known in the art that an optical surface is relatively easy to polish smooth but that the resulting curvature is very difficult to control. Indeed, the minimum amount by which the focal length can be controlled is limited by how thin a slice of material can be reliably removed from the surface of a lens.

The ability to produce optical elements having focal lengths that differ only a small amount becomes progressively more expensive as the difference in the focal length becomes less. Small differences in focal length require high precision for the surface to match the desired geometric shape. A curved optical surface cannot be approximated beyond the point where material can no longer be removed in sufficiently thin layers. The ultimate limit of matter to approximate any curved surface is the molecular composition of the material; the quantized nature of matter limits the approximation of an optical surface to the molecular layers. Chemistry limits how few molecular layers can be removed at a time from a given material. Removing single molecular layers strains optical fabrication to its ultimate limit. While higher precision optics are desirable for many applications, it is not practical to make high precision optics by mechanical grinding.

The difficulty in forming very slight differences in focal length is best exemplified in a long focal length lens. The f ratio of an optical system is defined by the ratio of the aperture of the system divided by its focal length. Optical systems having a high f ratio are difficult to make due to the extraordinary tolerances required to form the curved surfaces. For example, a simple plano convex lens having a focal length that is 100-200 times the diameter of the lens, i.e. f=100-200, is nearly flat. The curvature needed to obtain this tolerance can require that the thickness of the lens change by only a few molecular layers of glass across its entire aperture. This tolerance is almost impossible to obtain; curved optical surfaces that are so nearly flat are not commercially feasible.

Lenses having greater curvatures can be combined to produce very long focal length optical systems. However, a combination of lenses requires at least two high precision optical surfaces. The tolerances in curvature are impractical even though the optical surfaces have a greater curvature and are therefore easier to make. The resulting optical system is still quite expensive. Very long focal length optical systems tend to be one of a kind systems since it is not feasible to mass produce a large number of highly accurate lenses.

It is known in the art to form optical elements from material having a variable index of refraction so as to change the focal length of an optical system. For example, U.S. Pat. Nos. 4,441,791 and 4,592,628 disclose reflective surfaces that can be deformed electronically. U.S. Pat. Nos. 4,572,616 and 4,601,545 disclose lenses that use liquid crystal material to produce a lens having a variable focal length. Such lenses have been incorporated into eyeglasses as a substitute for traditional bifocal or trifocal lenses as illustrated in U.S. Pat. No. 4,795,248.

A lens made from a material having a dynamic index of refraction could, in principle, change the focal length of a material by any amount. However, known dynamic systems have not been applied to creating small changes in focal length. The refractive surfaces in the above patents probably cannot adjust to very small changes because the electrostatic field across the curved surface cannot be made sufficiently uniform. These nonuniform electrostatic forces should cause the index of refraction of the electro-optic material to change by small amounts across the aperture of the lens. This nonuniformity should be sufficient to distort the curvature of the lens by the same or greater amount required to cause a small change in focal length.

The index of refraction of various materials can also be changed using electrostatic and magnetic fields, temperature, and pressure. It is significant, however, that none of these materials have been applied to producing the small changes in focal length needed to produce a high precision optical system. Electro-optical materials remain the material of choice despite the uneven refractive index that they presumably leave across the aperture of the lens; it seems unlikely that a sufficiently smooth variation can ever be generated using electro-optical material. Indeed, none of the optical systems set forth in the foregoing references are high precision optics.

There exists a need in the art for a high precision optic that can change the focal length of an optical system by very small amounts without having to mechanically grind and polish a lens. It would be even better if the change in the focal length were dynamic so that the focal length could change. It would help to have an optical element that could change the focal length of an optical system by an amount equal to or less than a single molecular layer of material so that the change in focal length is no longer limited by the chemical and molecular properties of matter from which the lens is made. An appropriate optical element would have immediate application for forming high precision lenses, very long focal length optical systems and for changing the focal lengths of optical systems by very small amounts.

SUMMARY OF THE INVENTION

The present invention relates to an nearly index matched (NIM) optic that is made from two types of material having almost the same index of refraction but opposite optical curvatures at each point across the aperture of the optic. The net optical curvature that results from combining the two lenses has an absolute value that is reduced by the difference in the indices of refraction. For example, If the NIM optic has one element with an index of refraction $n_1$ of 1.5 and a focal length in vacuum of 10 cm, and the second element of the NIM optic has an index of refraction $n_2$ that differs by $\pm 0.01$, then the focal length of the combined NIM optic is 10 cm$\times(n_1-1)/(n_1-n_2)=\pm 500$ cm. Moreover, the focal length can be changed by changing the difference in the indices of refraction. Changing the focal length of the NIM optic by changing the difference in the indices of refraction has the same effect as changing the curvature of the elements of the NIM optic and has the advantage that neither element has to be mechanically ground and polished, nor must either element be physically repositioned. It has been discovered that the difference in the index of refraction can be controlled much more easily than can the physical shape or location of the elements of the NIM optic.

The effective focal length obtainable using a NIM optic can reduce the effective curvature of the boundary between the elements of the NIM optic to levels that can be far less than that associated with the chemical or molecular properties of a single solid material. Further, one of the components of the NIM optic can be a material having an index of refraction that can be changed using electrostatic or magnetic fields, or by dynamically changing its composition or temperature, or by applying or releasing pressure. It is considered preferable that the NIM optic use a material having an index of refraction that changes in response to changes in pressure. The NIM optic can be produced very economically if one of the materials is a fluid because the fluid will automatically adopt a curvature that is equal to but opposite that of the other material at every point on the boundary between the two elements. A very long focal length lens can be fabricated using two optical flats and boundaries between the elements that have a small, overall positive curvature. NIM optics having the same focal lengths can be made from lenses having different curvatures. The NIM optic of the present invention can be positioned in front of a curved mirror to change its focal length or be positioned in front of a flat mirror to double the curvature of the NIM optic.

One embodiment of the present invention uses a nearly index matched (NIM) optic formed from at least two elements having an index of refraction that nearly matches the other. The two elements NIM optic preferably comprise matched solid and fluid lenses. The solid lens has at least one curved surface in contact with the fluid. The fluid automatically adopts a shape that is equal in curvature to that of the solid element but has an opposite curvature. The liquid is held in place with any suitable window. The optical interface causes a small phase change in the light through the NIM optic. This change in phase causes a small change in the focal length of the entire optical system. The NIM optical cell can be made achromatic using other curved surfaces in the optical system. For example, an NIM optic having both solid and liquid lenses can be formed in which either the surface of the solid material opposite the optical interface has a non-zero curvature, the window holding the liquid in contact with the lens has a non-zero curvature, or both have non-zero curvature.

The simplest NIM optic is one in which the index of refraction of the lens is constant across the optical interface. A static NIM optic can change the focal length of the optical system by simple insertion or removal. A static NIM optic also makes an excellent very long focal length optic.

Another embodiment of the present invention allows the phase change of the light at the NIM optic to be made dynamic using at least one material at the optical interface that has an index of refraction that can change. The change in refractive index can be controlled by varying the appropriate parameter. An electro-optic NIM optic can be formed from an NIM optic in which at least one of the two materials has an index of refraction that changes in response to changes in an applied electrostatic field. The electrodes used to apply the field are preferably transparent so that they extend over the entire curved surface of the optical interface. The small difference in the relative indices of refraction between the materials limits the effect of differences in the refractive index of the electro-optical material caused by variations in the electrostatic field.

The NIM optic can be formed using a magneto-optic material b placing the optic inside a magnetic field. This result can be obtained by wrapping a solenoid around the NIM optic. In contrast to an electric field, the magnetic field will not be substantially distorted by the interface. Obtaining a uniform magnetic field, however, can be difficult and may require a substantial solenoid around the optic. Moreover, a magnetic field can polarize the light though the magneto-sensitive element of the lens and thus induce an aberration in the optic that is independent of the difference in the index of refraction at the boundary between the elements.

A thermo-sensitive material can produce the required thermal effect so long as the materials forming the optic respond to a change in temperature such that the index of refraction at the optical interface changes without significantly distorting the curvature of the interface. A thermo-sensitive NIM optic, however, should require time to reach thermal equilibrium. The temperature of the optic must be controlled to maintain a given phase change.

Another way to dynamically vary the phase change at the optical interface of the NIM optic is to change one of the materials comprising the optical interface. This is particularly simple to do if one of the materials remains fluid in use; the fluid can be replaced with one having a slightly different index of refraction. However, a sufficient amount of time must be allocated for the fluid to reach equilibrium after being replaced which slows down the frequency of the change.

Perhaps the most promising form of a dynamic NIM optic uses at least one material at the optical interface that changes its index of refraction in response to a change in pressure. The amount of pressure needed to change the index of refraction of many materials is much less than that needed to deform a lens made of glass or another hard lens material. Moreover, solid and fluid materials respond rapidly and uniformly to changes in pressure. A pressure sensitive material is therefore considered to be preferred for use in a dynamic NIM optic.

Numerous applications of the present invention are practical. A static lens works well in an array of slow lenslets for a Hartmann sensor, in an array of slow surfaces for atmospheric simulation, and in a test cell for phase shifting interferometry or null testing interferometry. A dynamic lens has application for nonmechanical focusing for precise photolithography such as is used to fabricate integrated circuits. Many other advantages of the present invention should emerge that are not yet fully appreciated.

DETAILED DESCRIPTION

Figure 1:
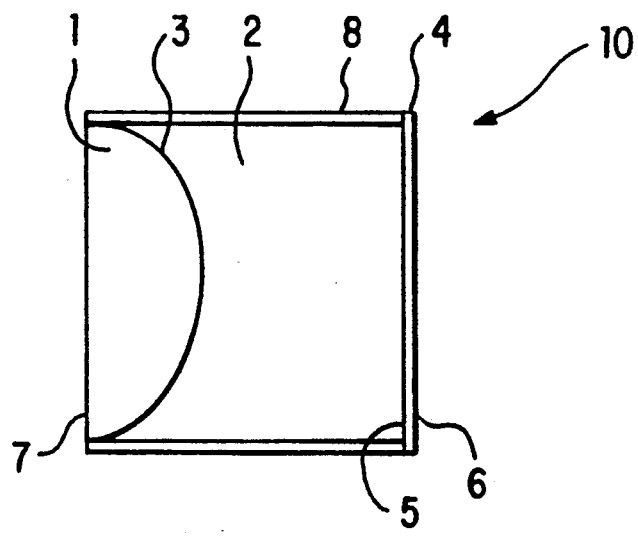
FIG. 1 shows a static NIM optic having a solid element in contact with a fluid element in which the indices of refraction of the two elements are nearly matched so that the lens can be used in a very long focal length optical system.

FIG. 1 shows a static very long focal length lens having a solid lens element 1 in contact with a fluid lens element 2 across a boundary 3. The interface can be curved or flat; as shown in FIG. 1 the interface has a smooth, basically spherical curvature. It is to be understood that irregular curvatures are also possible. An optical window 4 and cell walls 8 are shown holding the liquid in contact with the lens. It should be also possible to separate the elements after forming the interface if the fluid can be solidified. The maximum separation distance is a function of the curvature of the interface and the indices of refraction of the two elements and the interstitial medium, if any. Window 4 has two optically flat surfaces 5 and 6, the fabrication of which is known in the art. Surfaces 5 or 6 could be mirrored so that the light makes a double pass across the boundary 3 or transparent; the NIM optic shown in FIG. 1 would look the same. The solid lens 1 likewise comprises an optically flat surface 7. Window 4 and lens 1 can be sealed to housing 8 in any way appropriate. The two lens elements, the housing and window together comprise the nearly index matched (NIM) optic 10.

Placing liquid 2 in contact with lens 1 eliminates the need to form a second optical surface to nearly match the curvature of the first optical surface. The match is automatic and exact since the fluid naturally adopts the curvature of the solid to form the optical interface. Whether the fluid remains liquid after contacting the solid is irrelevant for establishing the proper optical curvature when the second element is a fluid.

Lens 1 can be formed from any appropriate material such as fused silica. The liquid can be Cargille fluid #50350 available from the R.P. Cargille Laboratories, Inc. Cedargrove, N.J. This fluid has an index of refraction that can be adjusted to within ±0.0002 of the index of refraction of a given material, such as fused silica, for a given wavelength of light. The absolute value of the difference in the index of refraction of the two elements of the NIM optic needed to form a long focal length lens fall is considered to preferably fall in the range of +0.1 to +0.01.

The static lens shown in FIG. 1 can have a focal length that is virtually as long as desired. The parameters that are relevant to determining focal length are the curvature of the boundary 3 and the index of refraction of the solid 1 and liquid 2 for any given wavelength of light. The focal length of the NIM optic shown in FIG. 1 is ideally the same at every wavelength. However, small changes with wavelength in the index of refraction of the solid and liquid will produce chromatic aberration. The magnitude of the chromatic aberration is proportional to the focal length of the lens. For the example of fused silica and Cargille fluid #50350, there is a mismatch in the index of refraction of from = +0.0013 to −0.002 over the range of 4861–6943 angstroms, respectively. This mismatch still gives acceptable image quality for many applications of a long focal length lens. Standard techniques known to the art can also be used to achromatize the compound lens by varying the curvature of surfaces 6 and 7 so that the windows are no longer flat.

While the present invention is not necessarily limited to any particular range of wavelengths, long focal length lenses made from nearly index matched elements will produce the best image quality using highly monochromatic light such as generated by a laser. Chromatic aberration is obviously no problem if the light has only one color. Faster optical systems—e.g. a NIM optic with a shorter focal length—can be made in the same manner as presently done for comparable optical systems.

Figure 2:
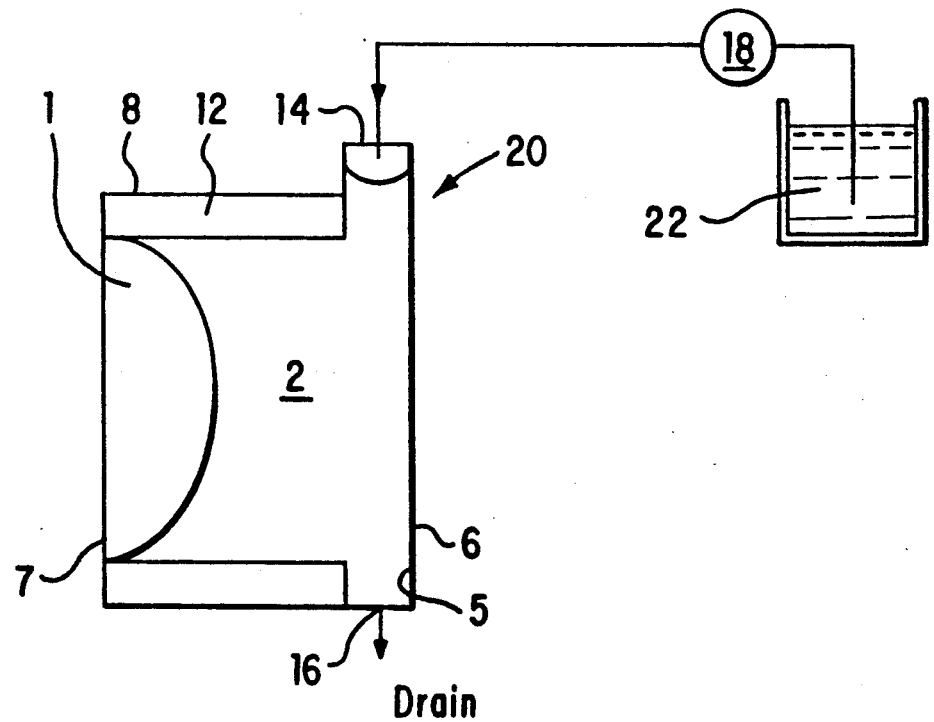
FIG. 2 shows a dynamic NIM optic that changes the temperature, composition, or both, of the optic to change its focal length.

FIG. 2 shows an alternate embodiment 20 of the NIM optic shown in FIG. 1 that permits dynamic adjustment of the focal length. The dynamic lens shown in FIG. 2 allows for changing the difference in the index of refraction at the boundary 3 by changing the temperature of the optic. Housing 8 comprises a thermal bath 12 and a heating or cooling system such as an electrical resistance element or a temperature regulating fluid. Many appropriate temperature regulating mechanisms are known in the art that will satisfy the requirements of the present invention.

Another way to change the phase difference across the boundary 3 is to directly change the index of refraction of the liquid 2. FIG. 2 shows an inlet 14 and an outlet 16 and a pump 18 for replacing the liquid 2 with a new liquid from reservoir 20. The fluid can be changed by opening the outlet 16 to remove some or all of the liquid 2 and then replacing it with fluid from reservoir 20 having a different index of refraction. The new liquid can have a temperature or a composition that differs from the liquid initially in the optical cell. Sufficient time should be allotted when changing the liquid to establish equilibrium in the liquid at the boundary 3 across the aperture of the NIM optic.

Figure 3:
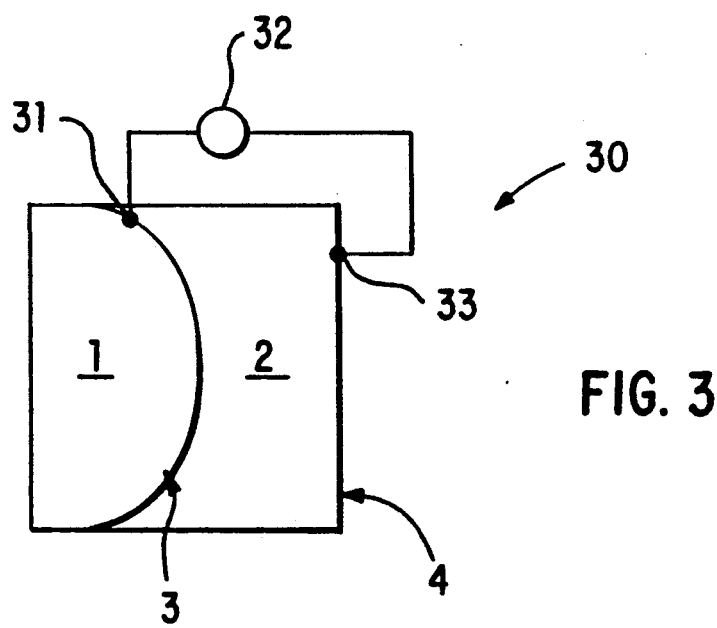
FIG. 3 shows another dynamic NIM optic that uses an electro-optic effect to change focal length.

FIG. 3 shows an alternate embodiment 30 for a dynamic NIM optic in which the liquid 2 is an electro-optic material. A voltage source 32 is connected to the electro-optic material 2 at contacts 31, 33. A transparent electrode is deposited across optical interface 3 to assure an even electrical contact across the curved surface. A similar transparent electrode is deposited on window 4. These electrodes can include the same type of electrodes used in the references cited in the background section of this application.

Suitable electro-optical materials are known in the art as illustrated in U.S. Pat. Nos. 4,795,248, 4,601,545 and 4,572,616. These electro-optical materials typically comprise a liquid crystalline material. A solid material having the appropriate index of refraction and electro-optical properties would be completely appropriate provided that the material 2 was sufficiently fluid when it contacted solid 1 to adopt the curvature of the interface 3. Given present materials, however, the electro-optical material 2 would comprise a ferromagnetic liquid crystal material of types known in the art as described in the above mentioned U.S. Patents.

Unlike temperature sensitive materials, electro-optic materials can change their refractive properties rapidly at frequencies greater than 1 kHz. This short response time has particular value for applications such as synthesizing the effect of turbulence in the atmosphere. The NIM optic can approximate density fluctuations in the atmosphere with an irregularly curved boundary 3. Changes in the refractive index of one of the elements of the NIM optic can then approximate changes in the atmosphere due to local temperature and density fluctuations.

Figure 4:
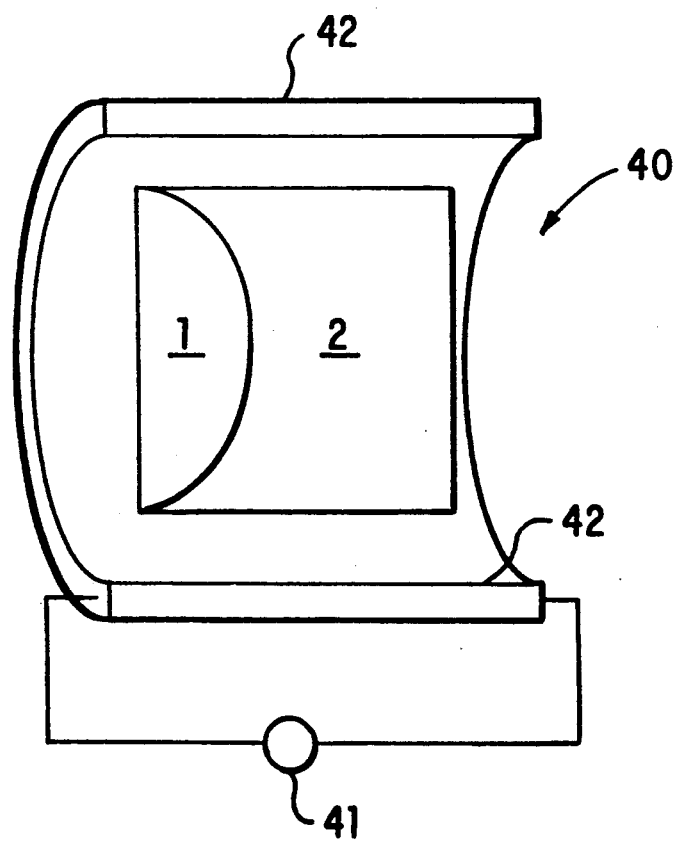
FIG. 4 shows another dynamic NIM optic that uses a magneto-optic effect to change focal length.

FIG. 4 is an alternate embodiment 40 on the dynamic NIM optic shown in FIG. 3 in which the electro-optic material 2 has been replaced with a magneto-optic material. A current source 41 powers one or more solenoids 42 to generate the magnetic flux in the magneto-optical material 2. The flux density across the optical cell 10 should be sufficiently uniform to create the desired level of uniformity in the index of refraction through out the magneto-optic material. The solid material 1 can be any glass or epoxy replicated optic. The liquid material 2 is a dilute ferrofluid of a type known in the art. See for example, Taketomi, *Magnetic Fluid's Pseudo-cotton Mouton Effects about 107 Times Larger Than That of Nitrobenzene*, 22 Japan J. Appl. phys., 1137-43 (1983). These materials have a response time at room temperature that is less than 100 microseconds.

High precision optics that use electro-optical or magnet-optical material suffer from distortions that ordinarily limit their performance. The electro-optical and magneto-optical methods for varying the refractive index in the fluid 2 rely on electric or magnetic alignment of the molecules. This change in alignment varies the components $e_{jk}$ of the polarization tensor. A dynamic long focal length lens requires a biaxial medium of the following form:

$$e_{jk} = \begin{pmatrix} e_{11} & 0 & 0 \\ 0 & e_{11} & 0 \\ 0 & 0 & e_{22} \end{pmatrix}$$

The terms $e_{11}$ and $e_{22}$ are functions of the applied electric or magnetic field. These fields are substantially parallel to the optical axis as shown in FIGS. 3 and 4. The curvature of optical interface 3 therefore refracts the ordinary ray in a different way than the extraordinary ray because the fluid 2 is birefringent. The result is an anisotropic aberration that applies only to electro-optical and magneto-optical lenses. Nevertheless, the anisotropic aberration reduces image quality. The magnitude and characteristic of the aberration depends on the material used and on the electric or magnetic fields applied. However, the magnitude of the aberration is inversely proportional to the focal length of the lens. A longer focal length lens therefore exhibits less aberration than a shorter focal length lens. The aberration is likewise inversely proportional to the thickness of the lens. A thinner lens therefore produces less of the anisotropic aberration. The anisotropic aberration should be minimal for a very long focal length lens.

Figure 5:
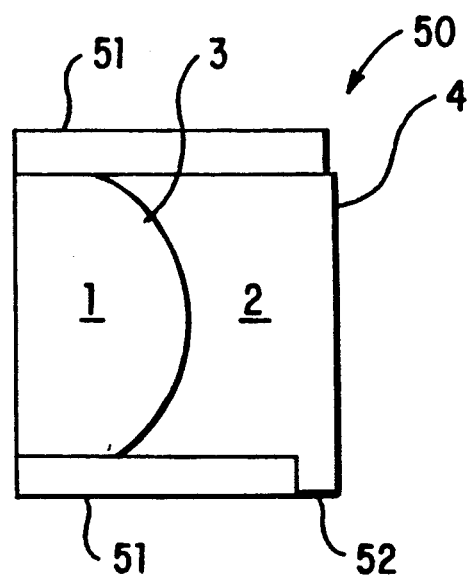
FIG. 5 shows another dynamic lens for a NIM optic that uses pressure to change focal length.

FIG. 5 shows another embodiment 50 of a dynamic NIM optic that uses pressure variation to change the effective focal length. Pressure vessel 51 encases the NIM optic 50. The constrictive material can be a magnetostrictive material such as nickel that has been deposited as a thin film through chemical or vapor deposition in ways known in the art. A piezoelectric material also could be used to apply pressure in ways known in the art. The method used to apply pressure is not considered important and many suitable methods are known in the art.

The applied pressure can be monitored using piezoelectric pressure transducer 52. The piezoelectric pressure transducer has a short response time that is comparable to that obtained using an electro-optic or magneto-optic material. Moreover, the change in the index of refraction across the fluid remains isotropic so that the NIM optic introduces no anistropic aberrations.

Conventional glass or fused silica can be used for the lens 1 and an organic solvent can be used for the liquid 2. The glass, liquid or both can be appropriately doped to produce a nearly matched index of refraction at the boundary 3.

Figure 6A:
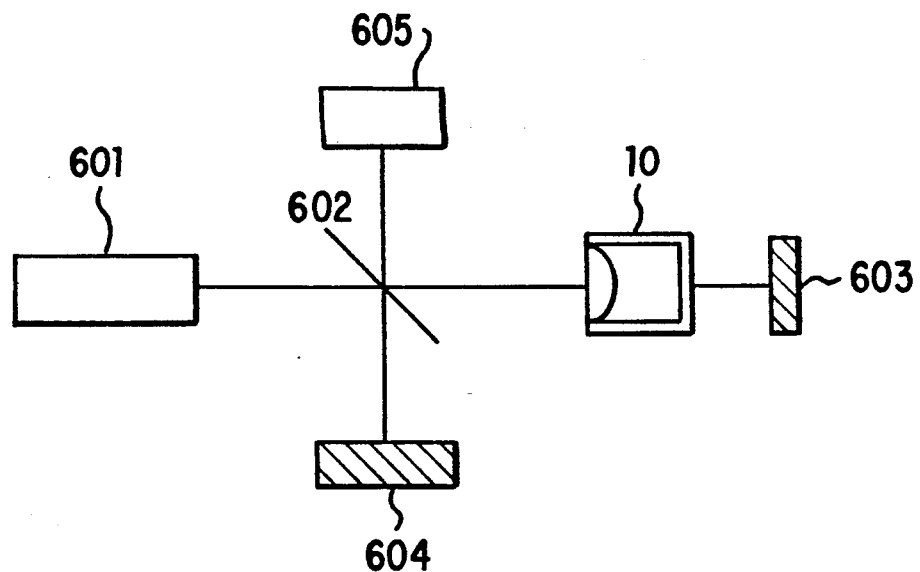
FIG. 6A shows how a NIM optic can reduce the curvature of a highly curved lens so that its curvature can be measured using phase shifting interferometry.

FIG. 6A shows how an NIM optic can apply phase shifting interferometry to measuring a highly curved, aspheric curvature. Monochromatic light from a laser passes through a beamsplitter 602 and the NIM optic 10 to reflecting optical surface 603. The light reflects back through NIM optic 10, and from there to beamsplitter 602 and camera or other imaging device 605. Light also reflects from beamsplitter 602 to reflecting surface 604. From surface 604 the light reflects back through beamsplitter 602 to camera 605. The pattern of interferometer fringes at camera 605 encodes the phase difference of the two paths of interferometer. Standard techniques known to the art can then be used to infer the focal length and aberrations of the NIM optic 10. These aberrations represent the aberrations of the solid lens 1 of the NIM optic.

The phase shifting interferometer shown in FIG. 6A can measure much greater curvatures than possible without using the NIM optic because the NIM optic reduces the curvature of the solid element of the NIM optic. This curvature reduction is comparable in its effect to reducing the curvature of the solid lens 1 to a level at which phase shifting interferometery is possible. The application of the present invention shown in FIG. 6 is thus capable of detecting much larger aspherisities of the solid lens 1 than would be possible if it were not mounted in a NIM optic. The nearly matched index effectively reduces the curvature of surface of the lens by the difference between the index of refraction of the lens comprising the NIM optic, i.e. by $n_1 - n_2$. The NIM optic thus functions as a test cell for the solid lens of optic 1.

Figure 6B:
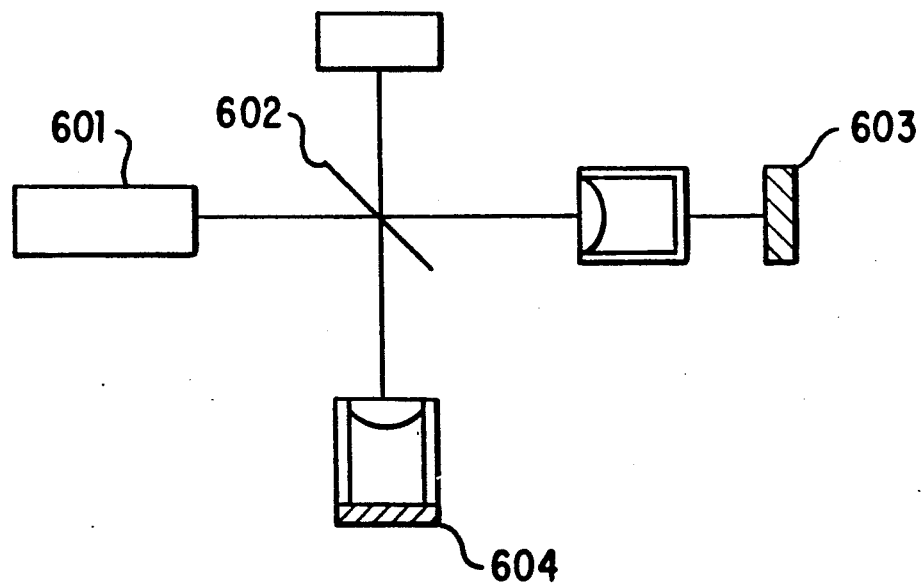
FIG. 6B shows how a NIM optic can be tested in an null testing interferometer to make many different NIM optics that have substantially the same focal length.

FIG. 6B shows how the curvature of many different NIM optics can be made substantially the same using a null test interferometer. FIG. 6B differs from FIG. 6A in that an additional NIM optic 10 has been positioned in front of mirror 604 and the camera 605 has been replaced with a focus detector 606. The temperature of the fluid element of NIM optic 20 is held constant and the composition of the fluid element is varied until the detector indicates that NIM optic 20 has the same focal length as the NIM optic 10. Any differences in the focal length of the solid element of NIM optic 20 are thus eliminated.

High precision lenses—lenses with a predefined curvature—are much more difficult to manufacture than are high quality lenses—lenses with a highly polished, uniform and regular curvature. It is well known in the art that high quality lenses are relatively easy to manufacture but that high precision lenses are not; it is easier to polish a surface smooth than to grind and polish it to an arbitrary shape. The present invention, in contrast, can make a high precision optic from low precision lens because the focal length of the NIM optic is a function of the difference in the index of refraction between the two elements of the NIM optic rather than the mechanical accuracy of the lens grinding. The difference in the index of refraction can be controlled to much greater accuracy than can the mechanical accuracy of a lens grinder. Therefore, the null test interferometer shown in FIG. 6B can make many high precision NIM optics—lenses having nearly the same focal length—at very low cost by changing the index of refraction of the fluid 2 rather than by trying to change the curvature on the solid lens 1. The resulting ability to make large numbers of higher precision NIM optics should have utility in making arrays such as used in a Hartmann sensor, as described below.

Figure 7:
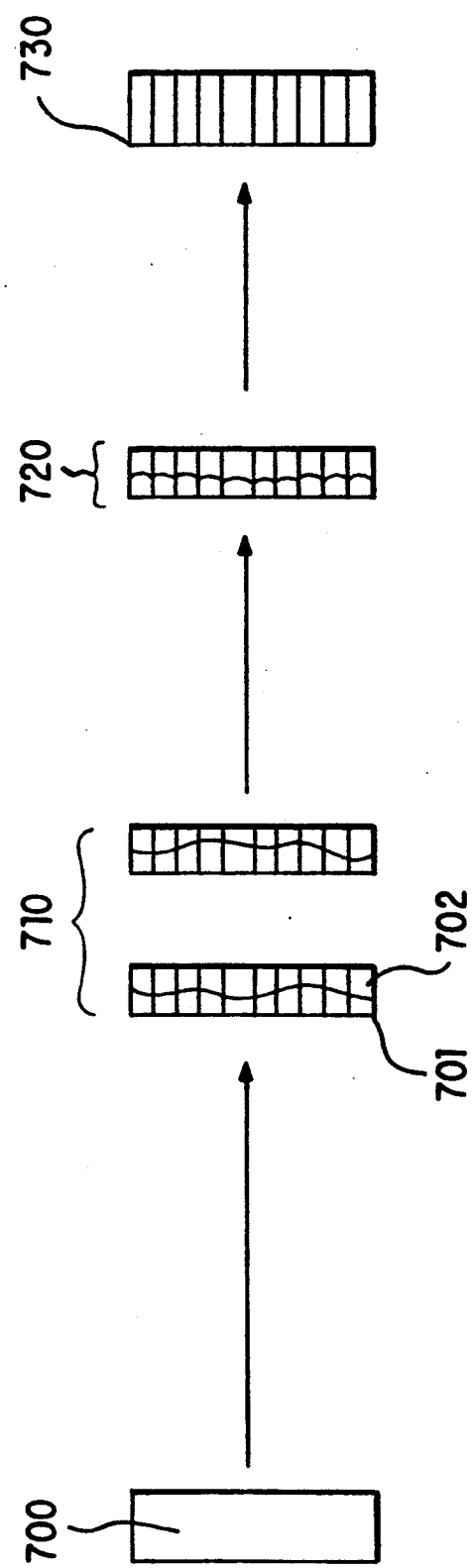
FIG. 7 shows an optical system that can use an array of NIM optics as a Hartmann sensor and as an atmosphere synthesis plate to simulate distortions to light that can be caused by turbulence in the atmosphere.

FIG. 7 illustrates how the NIM optic of the present invention can be used to simulate the effects of atmospheric turbulence on light as it propagates through the atmosphere. A light source 700 generates light having properties that are indicative of the source being modelled; the source may be either a natural source such as a star or an artificial source such as a lamp or a laser. The light propagates through a first array of NIM optics 710 which simulates aggregated, complicated aberrations in a way that is statistically similar to a model medium having an inhomogenous index of refraction such as the atmosphere. Array 710 presents a surface that is produced by techniques known to the art to yield a spatially varying optical thickness that varies by many wavelengths. The nearly matched index reduces the effective optical thickness variations by $n_{701} - n_{702}$ to a small distance that mimics that of a weakly inhomogenous media such as the earth's turbulent atmosphere.

The array 710 can be made from a single boundary having different portions with different curvature, a static NIM optic, or from separate variable dynamic NIM optics. Using dynamic NIM optics enables the array to simulate the effect of inhomogeneities in the atmosphere that vary with time. The boundary between elements of the NIM optic need not have a constant curvature across any of the cells of the array. Nevertheless, each point on the boundary between the two elements of the NIM optic should have a curvature that is equal in magnitude but opposite in sign such that the phase change across the boundary is a function of the difference in the relative refractive indices of the elements. It is not essential that the elements contact each other; the maximum permissible separation of the elements is a function of the magnitude of the curvature of the interface and of the index of refraction of the material, if any, separating the elements.

FIG. 7 further shows how a Hartmann sensor can be used to measure the phase front of the light propagating through array 710. A second array of NIM optics 720 focuses the light from the first array 710 onto a detector array 730. The individual NIM optics of second array 720 focus the light onto corresponding elements of the detector array 730 such that the detectors produce a signal that is indicative of the distortion of the light caused by the first array 710. The second array of NIM optics 720 and detector array 730 thus function as a Hartmann sensor.

Figure 8:
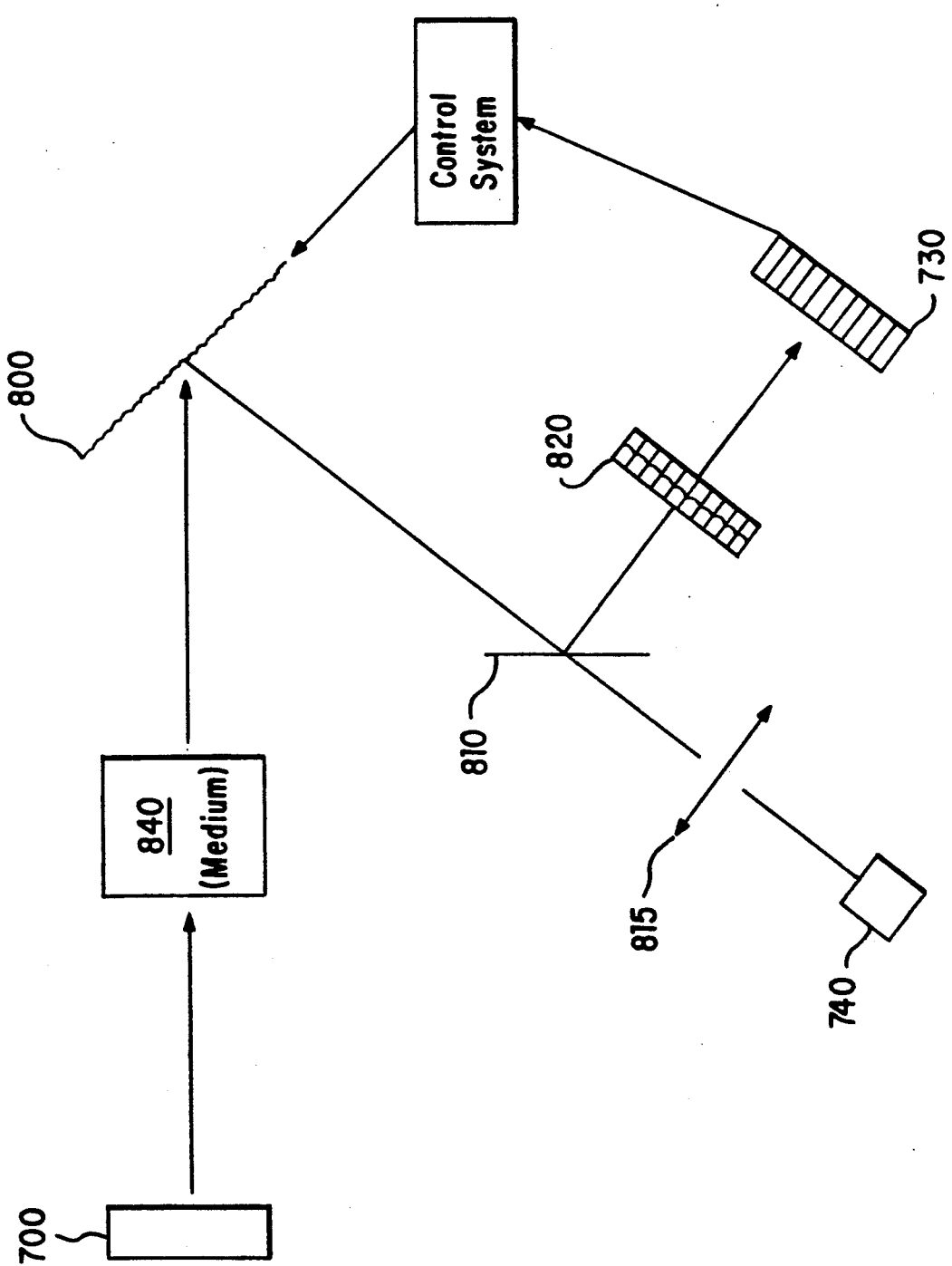
FIG. 8 shows how an array of NIM optics having almost exactly the same focal length can be used in a Hartmann sensor to compensate for actual atmospheric turbulence.

FIG. 8 shows how an array of NIM optics of the present invention can be used as an adaptive optic to compensate for atmospheric turbulence in forming an image. Light from a light source 700 propagates through a distorting medium 840 which may be either a natural medium such as the atmosphere or an artificial medium such as the first array of NIM optics 710 shown in FIG. 7. The light then reflects off an adaptive optic such as deformable mirror 800 to a beam splitter 810. Lens 815 focuses part of the light from beam splitter 810 at detector 740. An array of NIM optics 820 focus the other part of the light from beam splitter 810 on an image detector 730. Array 820 and image detector 730 together comprise a Hartmann sensor which can be the same Hartmann sensor used as shown in FIG. 7.

The image detector 730 generates an output signal that is fed into a control system 830. Using techniques that are known in the art, the control system 830 drives the deformable mirror 810 to compensate for the distortions of the medium 840. The image that is formed on detector 740 is thus corrected so that the distortions of the medium 810 are substantially eliminated—the effect is substantially the same as if deformable mirror 800 were flat and medium 810 did not distort the light at all. The techniques needed to compensate for the distortions of the medium are known in the art as discussed, for example, by Hardy et al., *Real-time Atmospheric Compensation*, Volume 67, The the Journal of the Optical Society of America, No. 3, Pages 360–369 (March 1977).

Figure 9:
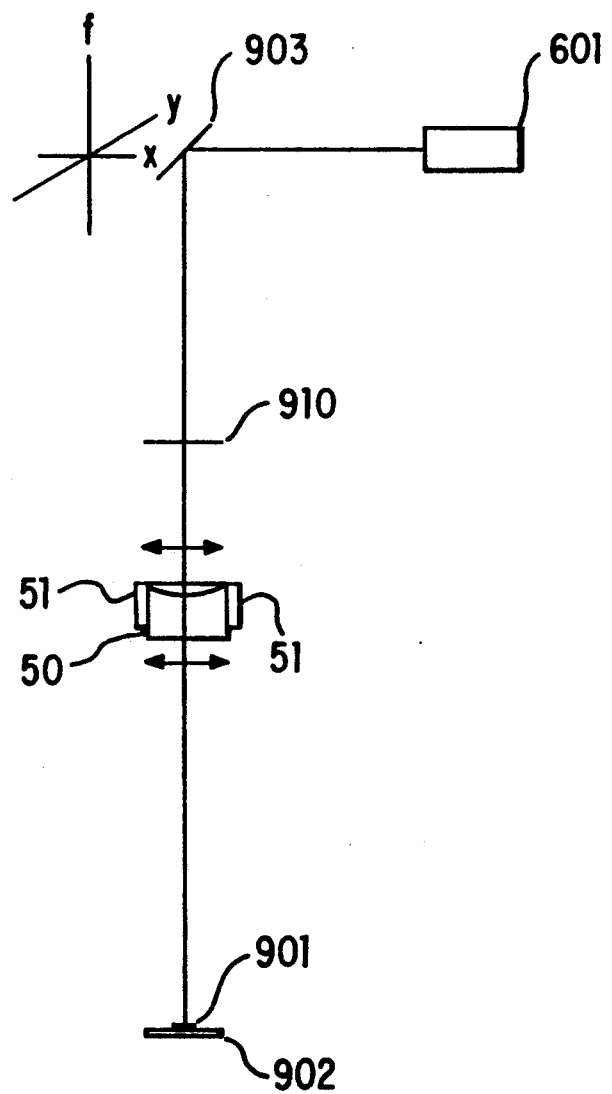
FIG. 9 shows a dynamic nearly matched optic used to adjust magnification for printing of an intergrated circuit chip.

FIG. 9 illustrates how the NIM optic of the present invention can correct the focus of more complex optical systems. FIG. 9 specifically shows the NIM optic 50 of FIG. 5 applied to the photolithography of a semiconductor wafer. Monochromatic light from a laser 601 reflects off a mirror 903 to a mask 910. The NIM optic 50 focuses the mask onto semiconductor wafer 901 supported on substrate 902. The pressure applied to cells 51 can adjust the size of the mask on the wafer.

The principles, preferred embodiments and modes of operation of the present invention have been described in the foregoing specification. The invention which is intended to be protected herein should not, however, be construed as limited to the teachings of the specification because the they merely illustrate the invention. There should be other ways to practice the present invention that will come within the meets and bounds of the inventions identified in the following claims as well as within the penumbra of the invention they define.

What is claimed is:

1. A nearly index matched (NIM) optic, comprising:
    means for receiving light from a light source, the light having a given range of wavelengths;

means for transferring the light across at least a first surface into a first material having a first index of refraction;

means for refracting the light across at least a first boundary formed in the first material, each point on the first boundary having an optical curvature of a given sign; and means for refracting the light at a second boundary formed in a second material that has a second index of refraction, each point on the second boundary corresponding to a point on the first boundary, each point on the second boundary having an optical curvature that is equal to the curvature of the corresponding point on the first boundary but opposite in sign, said first and second indices selected such that a difference between the second index of refraction and the first index of refraction is less than 0.1 and substantially the same over the range of wavelengths of the light, whereby the absolute value of the optical curvature at corresponding points on the first and second boundaries is reduced by the absolute value of the difference between the first and second indices of refraction thereby permitting control of focal length through selection of said indices.

2. An optical system as claimed in claim 1, wherein the light source is monochromatic.

3. An optical system as claimed in claim 2, wherein the light source is a laser.

4. An optical system as claimed in claim 1, wherein the first surface is flat.

5. An optical system as claimed in claim 1, wherein: the first boundary contacts the second boundary; and the second material is a fluid when it first contacts the first material.

6. An optical system as claimed in claim 5, further comprising means for changing the second index of refraction of the second material.

7. An optical system as claimed in claim 1, wherein the second material further comprises a second surface.

8. An optical system as claimed in claim 7, further comprising means for reflecting the light off a second surface of the second material that is positioned opposite the second boundary.

9. A lens, comprising:
a first element having a first surface and at least a first optical boundary, every point on the first optical boundary having a first optical curvature of a given sign, the first element being made from a first material having a first index of refraction, for a predetermined wavelength range of light; and
a second element having at least a second optical boundary, each point on the second optical boundary corresponding to a point on the first optical boundary, each point on the second optical boundary having a second optical curvature that is equal to the first optical curvature of the corresponding point on the first optical boundary but opposite in sign, the second element being made from a second material having a second index of refraction, said first and second indices selected such that a difference formed by subtracting the first and second indices of refraction is less than 0.1 and substantially the same for the wavelength range of light, whereby the absolute value of the first and second optical curvatures is reduced by the absolute magnitude of the difference between the first and second indices of refraction, thereby permitting control of focal length through selection of said indices.

10. A lens as claimed in claim 9, wherein the first and second elements contact each other.

11. A lens as claimed in claim 10, wherein the second material is a fluid.

12. A lens as claimed in claim 9, further comprising means for changing the index of refraction of the fluid at the wavelength of the light.

13. A lens as claimed in claim 9, wherein the means for changing the index of refraction is chosen from the group consisting of:
(a) an electro-optical connection that changes the index of refraction of the fluid at the wavelength of the light electronically;
(b) a magneto-optical connection that changes the index of refraction of at least the fluid at the wavelength of the light magnetically;
(c) a thermal connection that changes the index of refraction of at least the fluid by changing its temperature;
(d) a pump connection that changes the index of refraction of at least the fluid by changing the second material comprising the second lens; and
(e) a pressure vessel that changes the index of refraction of at least the fluid using pressure.

14. A lens as claimed in claim 13, wherein the first and second surfaces of the first are optically flat.

15. A lens as claimed in claim 13, wherein the light is monochromatic.

16. A lens as claimed in claim 15, wherein the light source is a laser.

17. A method for obtaining a very small change in the focal length in an optical system, comprising the steps of:
receiving light from a light source, the light having a given range of wavelengths;
transferring the light across a first surface into a first material having a first index of refraction;
refracting the light at a first optical boundary of the first material, every point on the first optical boundary having a curvature of a given sign; and
reducing the absolute value of the curvature of each point on the first optical boundary by refracting light from each point on the first optical boundary at a corresponding point on a second boundary made from a second material that has a second index of refraction, the second optical boundary having a second optical curvature that is equal in magnitude to the curvature of the first optical boundary but that has a second sign that is opposite the first sign, and selecting said first and second indices such that a difference formed by subtracting the first index of refraction and the second index of refraction is less than 0.1 and substantially the same over the range of wavelengths of the light, whereby the absolute value of each point on the first optical boundary is reduced by the difference between the first index of refraction and the second index of refraction.

18. A method as claimed in claim 17, wherein the light is monochromatic.

19. A method as claimed in claim 18, wherein the monochromatic light is generated by a laser.

20. A method as claimed in claim 17, further comprising the step of changing the second index of refraction of the second material.

21. A method as claimed in claim 17, further comprising the step of reflecting the light off a second optically flat surface of the second material that is positioned opposite the second curved surface.

* * * * *